(12) United States Patent
Yang et al.

(10) Patent No.: US 6,845,811 B2
(45) Date of Patent: Jan. 25, 2005

(54) REINFORCED SHELL MOLD AND METHOD

(75) Inventors: Xi Yang, Muskegon, MI (US); Boyd A. Mueller, Whitehall, MI (US)

(73) Assignee: Howmet Research Corporation, Whitehall, MI (US)

( * ) Notice: Subject to any disclaimer, the term of this patent is extended or adjusted under 35 U.S.C. 154(b) by 0 days.

(21) Appl. No.: 10/712,769

(22) Filed: Nov. 13, 2003

(65) Prior Publication Data

US 2004/0134634 A1 Jul. 15, 2004

Related U.S. Application Data

(63) Continuation-in-part of application No. 10/147,288, filed on May 15, 2002, now Pat. No. 6,648,060.

(51) Int. Cl.[7] .............................. B22C 1/02; B22C 9/04
(52) U.S. Cl. ........................................ 164/519; 164/361
(58) Field of Search ................................ 164/516–519, 164/361

(56) References Cited

U.S. PATENT DOCUMENTS

| | | | |
|---|---|---|---|
| 2,932,864 A | 4/1960 | Riester | 15/250.21 |
| 2,961,751 A | 11/1960 | Operhall et al. | 22/196 |
| 3,196,506 A | 7/1965 | Operhall et al. | 22/196 |
| 3,508,602 A | 4/1970 | Mellen, Jr. et al. | 164/361 |
| 3,654,984 A | 4/1972 | Mellen, Jr. et al. | 164/26 |
| 4,114,285 A | 9/1978 | Cruff et al. | 34/29 |
| 4,186,222 A | 1/1980 | Sellars et al. | 427/134 |
| 4,196,769 A * | 4/1980 | Feagin | 164/361 |
| 4,966,225 A | 10/1990 | Johnson et al. | 164/519 |
| 5,280,819 A | 1/1994 | Newkirk et al. | 164/98 |
| 5,297,615 A | 3/1994 | Aimone et al. | 164/519 |
| RE34,702 E | 8/1994 | Lane et al. | 164/517 |
| 5,335,717 A | 8/1994 | Chin et al. | 164/519 |
| 5,535,980 A | 7/1996 | Baumgartner et al. | 249/114.1 |
| 5,702,628 A | 12/1997 | Nemoto | 249/61 |
| 5,975,188 A | 11/1999 | Lassow et al. | 164/76.1 |
| 6,289,969 B1 | 9/2001 | Outten et al. | 164/134 |
| 6,352,101 B1 * | 3/2002 | Ghosh et al. | 164/516 |
| 6,364,000 B2 | 4/2002 | Naik et al. | 164/516 |
| 6,397,922 B1 | 6/2002 | Sachs et al. | 164/4.1 |
| 6,431,255 B1 | 8/2002 | Ghosh et al. | 164/361 |
| 6,450,243 B1 * | 9/2002 | Shaw et al. | 164/519 |
| 6,460,599 B1 | 10/2002 | Naik et al. | 164/122.1 |
| 6,467,534 B1 | 10/2002 | Klug et al. | 164/517 |
| 6,540,013 B1 | 4/2003 | Doles | 164/519 |
| 6,568,458 B2 | 5/2003 | Naik et al. | 164/361 |
| 2002/0195225 A1 | 12/2002 | Shaw et al. | 164/519 |

FOREIGN PATENT DOCUMENTS

| | | | |
|---|---|---|---|
| DE | 4418318 A1 | | 5/1994 |
| JP | 5506494 A2 | | 5/1980 |
| JP | 55-64945 | * | 5/1980 |
| JP | 56-17157 | * | 2/1981 |
| JP | 63203242 A2 | | 8/1988 |
| WO | 0005011 A1 | | 2/2000 |
| WO | 0114082 A1 | | 3/2001 |
| WO | 0145876 A1 | | 6/2001 |
| WO | WO 01/45876 | * | 6/2001 |
| WO | 0238308 A1 | | 5/2002 |

* cited by examiner

*Primary Examiner*—Kuang Y. Lin
(74) *Attorney, Agent, or Firm*—Edward J. Timmer

(57) ABSTRACT

A method of making a ceramic shell mold comprises repeatedly coating a fugitive pattern of an article to be cast with a ceramic slurry layer and applying on the ceramic slurry layer a refractory stucco to form a plurality of ceramic slurry layers and stucco layers on the pattern wherein at least one of the stucco layers is formed by applying discontinuous stucco fiber bundles held together in the bundles by a fugitive binder, which is removed during subsequent firing of the shell mold at elevated temperature.

11 Claims, 7 Drawing Sheets

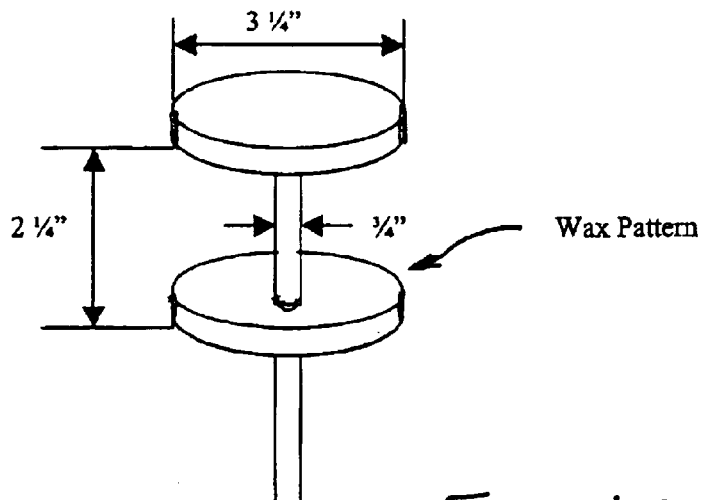
Fig 6A
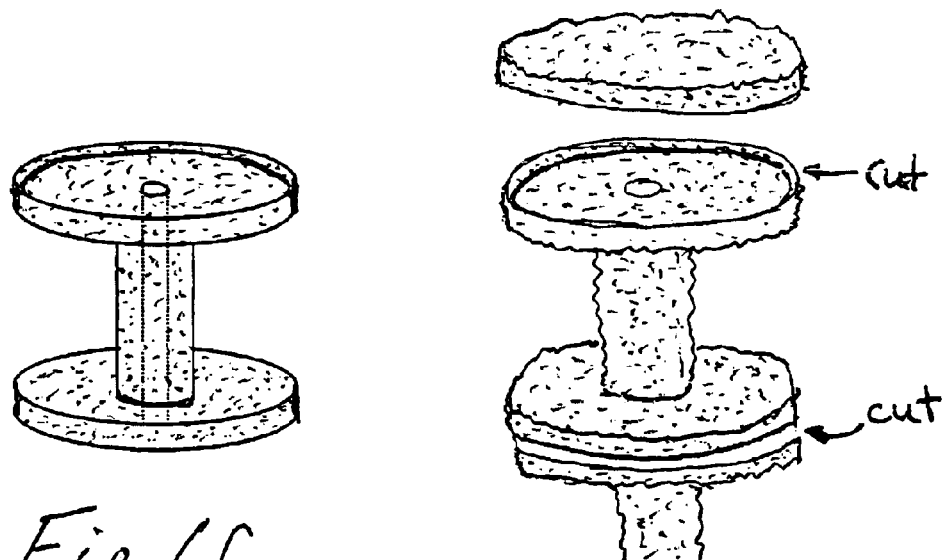
Fig. 6C
Fig. 6B

REINFORCED SHELL MOLD AND METHOD

This application is a continuation-in-part of copending Ser. No. 10/147,288 filed May 15, 2002 now U.S. Pat. No. 6,648,060.

FIELD OF THE INVENTION

The present invention relates to ceramic investment shell molds for casting molten metals and alloys and, more particularly, to ceramic shell molds that are fiber reinforced to improve mold tensile strength at high casting temperatures and yet provide reduced shell mold compressive strength during cooling to ambient temperature of the solidified casting therein to reduce or avoid casting hot tears (cracking), recrystallization and other defects.

BACKGROUND OF THE INVENTION

Both the investment casting process and the lost wax shell mold building process are well known, for example, as is apparent from the Operhall U.S. Pat. Nos. 3,196,506 and 2,961,751. The lost wax shell-mold building process involves repeatedly dipping a wax or other fugitive pattern of the article to be cast in ceramic slurry to provide a ceramic slurry layer, draining excess slurry, stuccoing the slurry with coarse ceramic particles to provide a stucco layer on the slurry layer, and drying the layers to build up a shell mold of desired wall thickness on the pattern. The green shell mold/pattern assembly then is subjected to a pattern removal operation to selectively remove the pattern from the shell mold. A commonly used wax pattern removal technique involves flash dewaxing where the green shell mold/pattern assembly is placed in an oven at elevated temperature to rapidly melt the wax pattern from the green shell mold. Following pattern removal, the green shell mold is fired at elevated temperature to develop mold strength for casting of molten metal or alloy therein.

Conventional lost wax ceramic shell molds can be prone to mold cracking or splitting during the pattern removal operation described above.

Attempts have been made to raise the capability of ceramic shell molds in the DS casting of superalloy components. For example, US Reissue 34,702 describes in one illustrative embodiment wrapping alumina-based or mullite-based reinforcement fiber in a continuous spiral about an intermediate mold wall thickness as it is being built-up. U.S. Pat. No. 6,364,000 discloses in one illustrative embodiment positioning one or more continuous carbon-based reinforcement fibers in a ceramic shell mold wall to this end.

However, ceramic investment casting shell molds have much higher compressive strength than tensile strength. After a shell mold is cast with molten metallic material at high temperature, the shell mold is allowed to cool to room temperature. During the cooling period, the molten material in the shell mold will consolidate and solidify from liquid state to solid state to form a casting. Once the metallic material becomes solid, the thermal expansion coefficient of the metallic material is much higher than that of the ceramic shell mold. Therefore, the thermal shrinkage of the metallic material (the casting) is constrained by the ceramic shell mold. The dimensional mismatch between the solid casting and the shell mold results in a general tensile stress on the solid casting and compressive stress on the ceramic shell mold. This general stress on the solid casting is typically enhanced at certain areas thereof due to complex casting geometries and can result in serious casting defects, such as casting cracks (hot tears), grain recrystallization in single crystal castings, and other defects.

SUMMARY OF THE INVENTION

The present invention involves a method of making a ceramic shell mold comprising repeatedly coating a fugitive pattern of an article to be cast with a ceramic slurry layer and applying on the ceramic slurry layer a refractory stucco to form a plurality of ceramic slurry layers and stucco layers on the pattern wherein one or more of the stucco layers is/are formed at least in part by a plurality of bundles of discontinuous stucco fibers held together by a fugitive organic binder.

In a preferred embodiment of the invention, one or more stucco layers is/are formed by applying a plurality of bundles of the discontinuous stucco fibers held together by the fugitive organic binder followed by applying granular stucco particles on the randomly oriented discontinuous stucco fiber bundles to pack the discontinuous stucco fiber bundles down on the underlying ceramic slurry layer present. The granular stucco particles preferably are applied on the discontinuous stucco fiber bundles while the underlying slurry layer is still wet such that a majority of the packed down discontinuous stucco fiber bundles stick to the slurry layer. The granular stucco particles preferably are applied on the randomly oriented discontinuous stucco fiber bundles to form a stucco layer comprising a mat of the discontinuous stucco fiber bundles and the granular stucco on and in the mat.

In an illustrative embodiment offered to illustrate but not limit the invention, the granular stucco particles are applied by raining the granular stucco particles by gravity down on the discontinuous stucco fiber bundles.

The present invention also provides a ceramic shell mold wherein at least one of the stucco layers comprises the discontinuous stucco fiber bundles and the granular stucco particles.

Shell molds pursuant to the invention are advantageous to resist mold splitting during the pattern removal operation and yet provide reduced shell mold compressive strength during cooling of a solid metallic casting therein to ambient temperature to reduce or avoid casting hot tears (cracking), recrystallization and other defects.

The present invention will become more readily apparent from the following detailed description.

DESCRIPTION OF THE DRAWINGS

FIG. 6A is a perspective vie of a wax pattern used to make compression test spools. FIG. 6B is a perspective exploded view showing cuts made through the shell mold invested about the wax pattern. FIG. 6C shows the compression test spool sample used in compression testing.

DETAILED DESCRIPTION OF THE INVENTION

Figure 1:
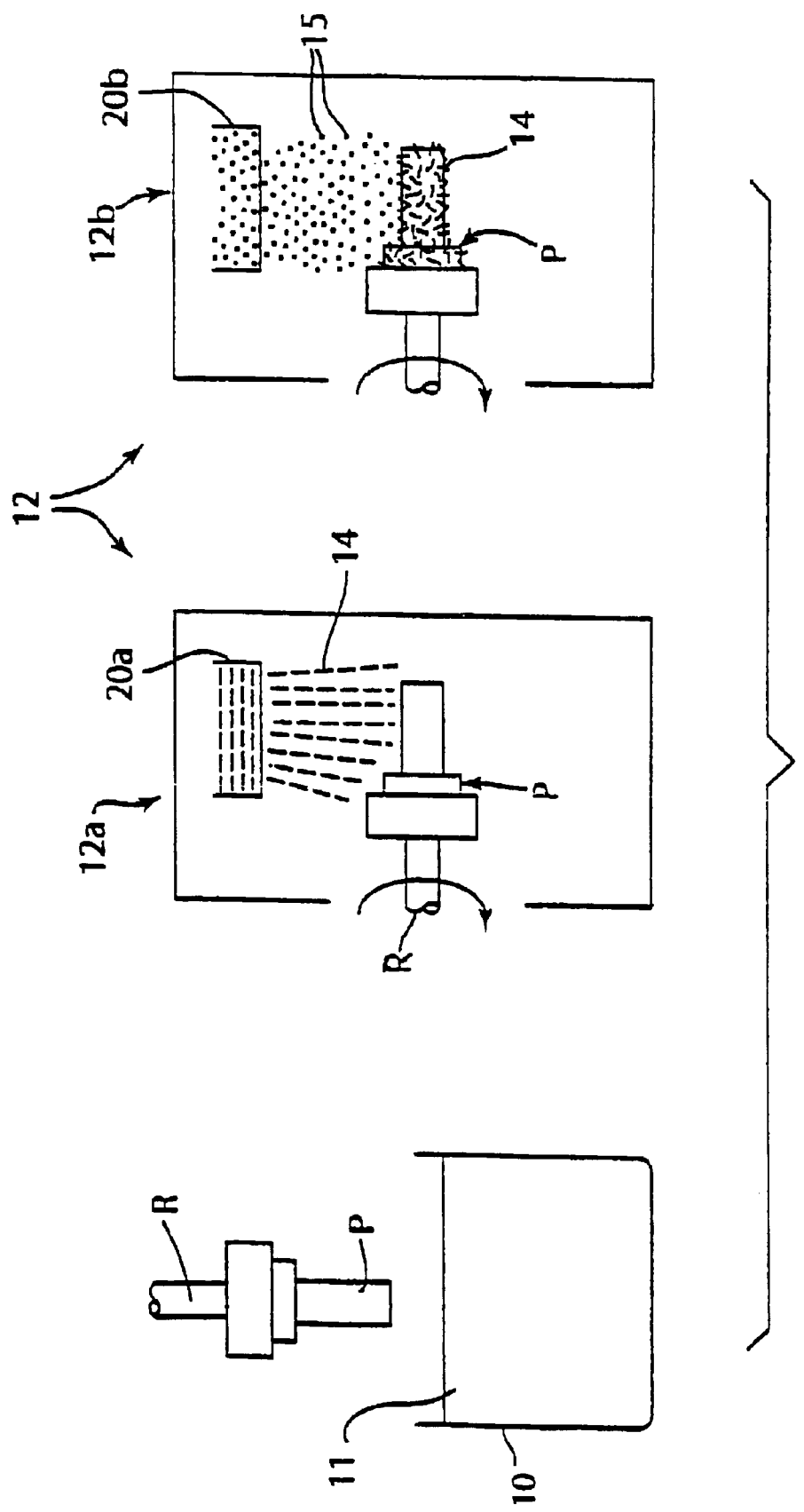
FIG. 1 is a schematic diagram of a method of making a investment shell mold pursuant to an illustrative embodiment of the invention.

FIG. 1 illustrates schematically a lost wax ceramic shell mold building process to which the invention is applicable where a ceramic shell mold is formed by repeatedly coating a fugitive pattern of the article cast with refractory flour slurry (i.e. ceramic flour in a liquid binder) to provide a slurry layer, draining excess slurry, stuccoing the slurry layer with refractory stucco to provide a stucco layer on the slurry layer until a desired shell mold wall thickness is built up. The fugitive pattern can comprise a conventional wax, wax/polymer blends, polymeric or other fugitive materials molded or otherwise formed to the shape of the article to be cast as is well known in the art. Such fugitive patterns are removable from the green shell mold invested thereabout using conventional pattern removal techniques such as melting, leaching and/or vaporizing the pattern therefrom.

In FIG. 1, the pattern P is dipped in the refractory flour (e.g. ceramic powder) slurry 11 held in a vessel 10, drained of excess refractory slurry by temporary holding the pattern above the vessel 10 for a predetermined time, and then is stuccoed at a stucco-applying station 12 while the refractory slurry layer is still wet. The pattern P typically is moved by a robot arm R. In practice of an illustrative embodiment of the invention, the stucco-applying station 12 comprises a fiber bundle stucco-applying apparatus 12a for applying discontinuous stucco fiber bundles 14 to the pattern and a granular stucco-applying apparatus 12b for applying granular stucco particles 15 to form at least one of the stucco layers to comprise both discontinuous stucco fiber bundles 14 and granular stucco particles 15 pursuant to the invention. Other stucco layers may comprise only granular stucco particles, which are applied to the pattern at the granular stucco-applying apparatus 12b. That is, the fiber bundle stucco-applying apparatus 12a is not used when the stucco layer comprises only granular stucco particles. The stucco applying apparatus 12a, 12b can comprise conventional stucco towers having a bin 20a, 20b respectively, in which discontinuous stucco fiber bundles and granular stucco particles reside, respectively.

The pattern P with the stuccoed refractory slurry layer then is dried in air or in a conventional drying apparatus. After drying, the pattern P is subjected to similar dipping, draining, stuccoing and drying operations until the desired shell mold wall thickness is built up on the pattern. Drying of ceramic slurry/stucco layers is described in U.S. Pat. Nos. 2,932,864; 4,114,285; and others as well as U.S. Ser. No. 09/690,144 of common assignee herewith.

Typically, in practicing the lost wax process, one or more so-called prime coat (refractory slurry) layers and prime coat stucco layers are applied to the pattern initially to provide a facecoat for contacting the molten metal or alloy to be cast in the shell mold. Then, the facecoated pattern is subjected to repeated steps of slurry dipping, draining, stuccoing and drying steps to form back-up slurry layer/stucco layers on the prime coat slurry layer(s) until the desired shell mold wall thickness is built-up. In general, the prime coat(s) employ(s) a finer refractory flour in the slurry than that present in the back-up slurries. The prime coat stucco similarly is a less coarse stucco than the back-up stucco. The prime coat slurry/stucco typically comprise a respective refractory material, such as a ceramic, to form a facecoat suitably for contacting the molten metal or alloy being cast without adverse reaction therewith. The back-up slurry and back-up stucco can comprise a refractory flour and refractory stucco which may be different or the same as those used for the prime coat slurry/stucco. The refractory flours/stuccoes used in the shell mold layers for casting nickel base and cobalt base superalloys typically comprise ceramic flours/stucco as described in U.S. Pat. Nos. 4,966,225, 5,335,717, 5,975,188 and others, although refractory materials such as graphite, nitrides, carbides, and other materials may be used as described for example in U.S. Pat. No. 5,297,615, the teachings of all of these patents being incorporated herein by reference.

The present invention involves forming at least one, preferably a plurality, of the stucco layers of the shell mold by applying the discontinuous stucco fiber bundles 14 followed by applying granular stucco particles 15 on the discontinuous stucco fiber bundles. The discontinuous stucco fiber bundles each comprises a plurality of discontinuous stucco fibers 14a held together by an organic binder 14b, FIG. 2A. In an embodiment of the invention offered for purposes of illustration and not limitation, the granular stucco particles 15, FIG. 1, are applied at apparatus 12b on the discontinuous stucco fiber bundles 14 previously applied at apparatus 12a, FIG. 1, to impact and pack the initially randomly oriented discontinuous stucco fiber bundles 14, FIG. 2A, down on the slurry layer underlying the discontinuous fiber bundles. The granular stucco particles 15 preferably are applied on the discontinuous stucco fiber bundles 14 while the underlying slurry layer is still wet such that a majority, preferably greater than 75% and more preferably 80–90%, of the discontinuous stucco fiber bundles 14 are packed down and stick to the slurry layer as a result of impact by the falling granular stucco particles 15. The granular stucco particles preferably are applied on the randomly oriented discontinuous stucco fiber bundles to form a stucco layer comprising a generally two dimensional mat of packed down discontinuous stucco fiber bundles 14 and the granular stucco particles 15 on and in the mat, FIG. 2B, where the granular stucco particles are represented by dots in FIG. 2B.

The discontinuous stucco fiber bundles 14 can comprise amorphous silica fibers with greater than 95 weight % purity, alumina fibers, carbon or graphite fibers, or other material including organic fibers suitable for the particular shell mold being formed and the particular casting parameters to be used with the fibers 14a held together in a respective bundle by a fugitive organic binder 14b residing around the fibers 14a and between the fibers 14a.

For use in directional solidification of nickel and cobalt based superalloys, the stucco fibers 14a have high temperature properties compatible with the shell mold temperatures during casting. For example, stucco fibers used in single crystal casting of superalloys must not react with other shell mold materials at casting shell mold temperatures of about 2700–2850 degrees F. to produce deleterious phases, and must not significantly increase the high temperature creep rate of the shell mold at such casting temperatures. For stucco fibers used in casting equiaxed grain superalloy components, the stucco fibers should have such high temperature properties compatible with the shell mold temperatures of 2000–2400 degrees F.

The fugitive organic binder 14b typically is present in an amount of about 4 weight % of the total weight of the fiber bundle 14, although the invention is not so limited as other amounts of binder in each bundle 14 can be used in practice of the invention. The binder typically comprises a thermally degradable (e.g. combustible) material such as polyvinyl alcohol (PVA), acrylic latex and phenolic resin.

Each fiber bundle 14 typically comprises 1000 to 5000 fibers and has a bundle diameter of about 0.01 to about 0.02 inch and a bundle length of about 0.1 to about 0.5 inch, although the invention is not limited in this regard as other numbers of fibers in each bundle, bundle diameters, and bundle lengths can be used in practice of the invention. The stucco fibers 14a are discontinuous, relatively short fiber lengths having a length greater than fiber diameter. The stucco fibers typically have a fiber diameter of 5 to 50 microns for the length range set forth above, although the invention is not limited in this regard as other fiber diameters can be used in practice of the invention. The stucco fibers typically have an aspect ratio (length to diameter) of about 10 to about 50.

The granular stucco particles 15 are characterized as having a blocky grain morphology and aspect ratio less than 2, a particle shape typical of granular stuccoes used heretofore in the lost wax shell mold process and described in the above cited US Patents. The granular stucco particles can comprise silica, alumina or other suitable refractory stucco materials suitable for the particular mold being formed and the particular casting parameters to be used. The discontinuous stucco fibers 14a and the granular stucco particles 15 comprise the same or different refractory or ceramic material.

Figure 2A:
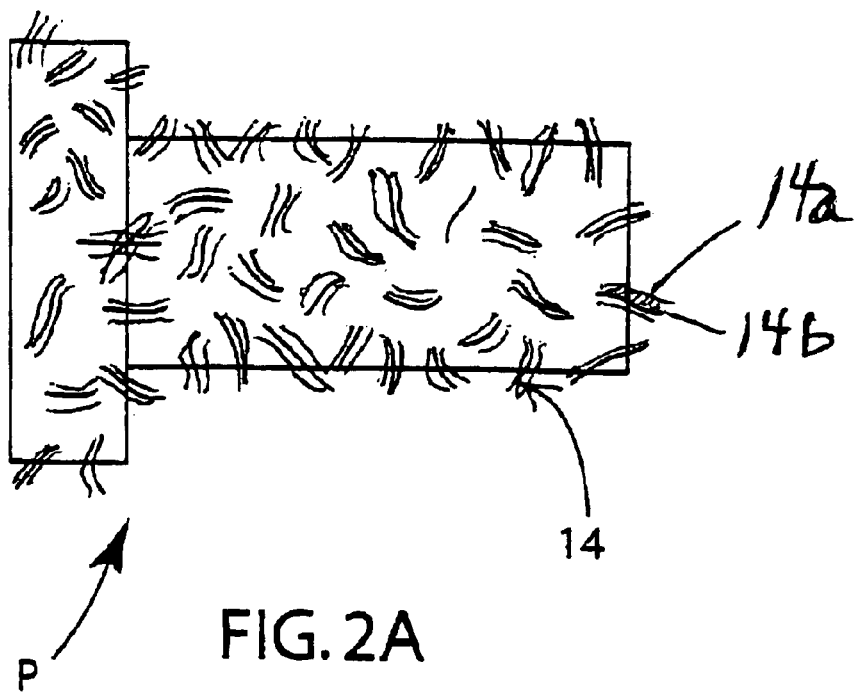
FIG. 2A is a schematic partial view of a shell mold wall on the pattern showing the randomly oriented discontinuous stucco fiber bundles applied on a still wet refractory slurry layer before the stucco fibers are packed down to form a generally two dimensional mat.

The stucco applying apparatus 12a, 12b can comprise conventional stucco towers having an elevated bin 20a, 20b, respectively, in which discontinuous stucco fiber bundles 14 and granular stucco particles 15 reside, respectively. At apparatus 12a, the discontinuous stucco fiber bundles 14 are released from the bin 20a to fall or rain down by gravity on the wet refractory layer on the pattern P, which is disposed a preselected distance (e.g. 20 to 60 inches) below the bin 20a and rotated so that the stucco fiber bundles will impact and cover the entire surface area of the wet refractory slurry layer. Typically, the discontinuous stucco fiber bundles 14 are released from bin 20a until stucco fiber bundles are observed to fall off of (not stick to) the pattern as a result of its being completely covered by previously released stucco fiber bundles 14, although a predetermined amount of stucco fiber bundles can be released over time. The discontinuous stucco fiber bundles 14 stick to the wet slurry layer in a three dimensional array of randomly oriented fiber bundles 14 as illustrated in FIG. 2A. At apparatus 12b, the granular stucco particles 15 are released from the bin 20b to fall or rain down by gravity on the fiber bundle-stuccoed, still wet refractory layer on the pattern P disposed a preselected distance (e.g. 20–60 inches) below the bin 20b and rotated so that the granular stucco particles impact the stucco fiber bundles 14 and pack them down on the still wet refractory slurry layer. Typically, the granular stucco particles 15 are released from bin 20b until granular stucco particles are observed to fall off of (not stick to) the pattern as a result of its being completely covered by previously released granular stucco particles 15, although a predetermined amount of granular stucco particles can be released over time. Any conventional stucco tower can be used in practicing the invention. A particular stucco tower which can be used to practice the invention is described in U.S. Pat. No. 6,503,324, of common assignee herewith, the teachings of which are incorporated herein by reference.

The fiber stucco bundles 14 or granular stucco particles 15 can be applied to the pattern by other means including spray coating, fluidized bed coating or other techniques which provide sufficient energy to the stucco particles to pack down the stucco fiber bundles to form a two dimensional mat type structure on the pattern.

The one or more stucco layers formed pursuant to the invention by applying discontinuous stucco fiber bundles 14 followed by applying a granular stucco particles 15 on the randomly oriented discontinuous stucco fiber bundles can preferably comprise intermediate stucco layers of shell mold wall 25, although the invention is not limited in this regard. For example, for purposes of illustration and not limitation, the stucco layer comprising the discontinuous stucco fiber bundles 14 and granular stucco particles 15 can comprise the 3rd, 4th, 5th, 6th, etc. intermediate stucco layers of the shell mold wall as it is being built-up layer-by-layer.

Figure 2B:
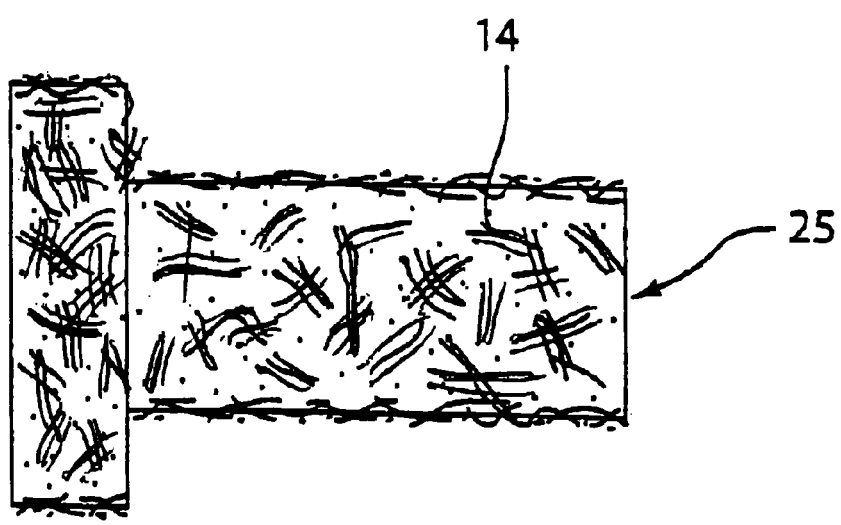
FIG. 2B is a schematic partial view of a shell mold wall showing the randomly oriented discontinuous stucco fiber bundles applied on a still wet refractory slurry layer and after the stucco fiber bundles are packed down to form a generally two dimensional mat.

The stucco layer(s) formed pursuant to the invention by applying granular stucco particles 15 on the randomly oriented discontinuous stucco fiber bundles 14 of FIG. 2B exhibit less porosity for a given shell mold wall thickness and less fiber-bridging (where fibers bridge across one another creating a void) than a stucco layer comprising only discontinuous stucco fibers without applying granular stucco. Application of the granular stucco particles rearranges the randomly oriented discontinuous stucco fiber bundles to provide a higher fiber packing density with some granular stucco particles 15 filling spaces between the stucco fiber bundles 14 and a more dense shell mold wall 25, compare FIGS. 3 and 4.

Shell molds pursuant to the invention exhibit greater strength in tension and greater toughness (resistance to crack propagation) than shell molds without one or more of the composite stucco layers (comprising the discontinuous stucco fiber bundles 14 and granular stucco particles 15) and are advantageous to resist mold splitting during the pattern removal operation. Also, shell molds pursuant to the invention exhibit reduced shell mold compressive strength during cooling to ambient temperature of the solidified casting therein to reduce or avoid casting hot tears (cracking), recrystallization and other defects. For example, after the green (unfired) shell mold is built-up on the pattern assembly as described above, the green shell mold/pattern assembly then is subjected to a pattern removal operation to selectively remove the pattern from the shell mold. A commonly used wax pattern removal technique involves flash dewaxing where the green shell mold/pattern assembly is placed in an oven at elevated temperature to rapidly melt the wax pattern from the green shell mold. Following pattern removal, the green shell mold is fired at elevated temperature to develop mold strength for casting of molten metal or alloy therein. When the green shell mold is fired, the fugitive organic binder 14b is burned off (combusted) or otherwise removed, leaving spaces or gaps around and between the stucco fibers 14a in the one or more stucco layers containing such stucco fiber bundles. The flexibility of individual stucco fibers to buckle or flex within the spaces and/or the spaces or other porosity present in the post-cast shell mold, results in reduced compressive strength of the shell mold to lower the stresses on the casting and thus the extent of defects in the metallic casting during cooling to room temperature in the shell mold. The burn-off or other removal of the binder also can create a multitude of weak interfaces within the one or more shell stucco layers containing such stucco fibers, which also can reduce compressive strength of the shell mold and therefore lower the stresses on the casting and defects in the casting during cooling to room temperature. In effect, the compressive strength of the shell mold is reduced so that the shell mold can be crushed, collapse or yield at low enough stress levels (or high temperatures) that stresses on the solid metallic casting do not reach levels which cause casting defects such as cracking (hot tears) without reducing the tensile strength of the shell mold that is provided during pattern removal, mold handling, and casting. Moreover, in addition to the effects of fiber flexing and buckling to reduce compressive stress, use of a silica stucco fiber bundles 14 can further reduce compressive strength below 200 degrees C. For example, the silica stucco fibers of the bundles can devitrify to crisotbalite at single crystal casting temperatures (2700 to 2850 degrees F.) and then undergo a phase change during cooling at 200 degrees C. This phase change has a large volume reduction, which causes cracking and weakening of the fibers. If carbon or graphite stucco fiber bundles are used, controlled oxidation of the carbon or graphite may also weaken the compressive strength of the shell mold.

The following Examples are offered to further illustrate the invention without limiting it.

EXAMPLES

Example 1

Shell molds were made by the lost wax process described in U.S. Pat. No. 4,966,225 by applying to identical wax patterns ceramic slurry layers/stucco layers as shown in Table I below:

alumina granular stucco where the stucco particles have a particle size less than 28 mesh and greater than 48 mesh. The stucco for the remaining layers was 14×28 mesh tabular alumina granular stucco. As is apparent, the ceramic slurry used for the 4th, 5th, and 6th layers also were the same. However, 4th, 5th, and 6th stucco layers were different in that in making mold sample A, the 4th, 5th, and 6th stucco layers comprised only 14×28 tabular alumina, wherein in making mold sample B, the 4th, 5th, and 6th stucco layers comprised only ¼ inch long chopped (discontinuous) "Q" fiber bundles (designated ¼" Q Fiber in Table I). In making mold sample C, the 4th, 5th, and 6th stucco layers comprised the ¼ inch long chopped "Q" fiber bundles followed by application of granular 14×28 stucco particles for fiber stucco packing pursuant to the invention.

The discontinuous chopped "Q" fiber bundles comprised silica and had an individual fiber diameter in the range of 9 to 14 microns with a bundle diameter of 0.01 to 0.02 inch and a bundle length of ¼ inch. The bundles were made from unchopped "Q" fiber yarn (Quartzel silica) available from Saint-Gobain Quartz, 1600 W. Lee St., Louisville, Ky. The continuous "Q" fiber yarn was pulled through a liquid bath of the organic binder (e.g PVA or latex) and then chopped by OMNIA LLC, Raleigh, N.C. to form bundles of "Q" fibers held together by the PVA binder. The 14×28 granular stucco particles comprised grains having a particle size of less than 28 mesh and greater than 48 mesh and comprised tabular alumina. The 14×28 alumina granular stucco particles are available from Alcoa Alumina and Chemicals, Bauxite, Ark. Mesh sizes are with respect to U.S. standard screen system. In making the mold samples, both the "Q" stucco fiber bundles and 14×28 alumina granular stucco particles were applied to the pattern by free fall from 5 feet above the pattern as each mold sample was being built-up.

TABLE I

|  | Sample A (w/o fiber) | | Sample B (w/o stucco packing) | | Sample C (w/ stucco packing) | |
| --- | --- | --- | --- | --- | --- | --- |
|  | Slurry | Stucco | Slurry | Stucco | Slurry | Stucco |
| 1st | A | −120 Alumina | A | −120 Alumina | A | −120 Alumina |
| 2nd | B/C | −90 Alumina | B/C | −90 Alumina | B/C | −90 Alumina |
| 3rd | B/C | 28 × 48 Tab Alumina | B/C | 28 × 48 Tab Alumina | B/C | 28 × 48 Tab Alumina |
| 4th | B/C | 14 × 28 Tab Alumina | B/C | ¼" Q Fiber | B/C | ¼" Q Fiber + 14 × 28 Tab Alumina |
| 5th | C | 14 × 28 Tab Alumina | C | ¼" Q Fiber | C | ¼" Q Fiber + 14 × 28 Tab Alumina |
| 6th | C | 14 × 28 Tab Alumina | C | ¼" Q Fiber | C | ¼" Q Fiber + 14 × 28 Tab Alumina |
| 7th | C | 14 × 28 Tab Alumina | C | 14 × 28 Tab Alumina | C | 14 × 28 Tab Alumina |
| 8th | C | 14 × 28 Tab Alumina | C | 14 × 28 Tab Alumina | C | 14 × 28 Tab Alumina |
| 9th | C |  | C |  | C |  |

Figure 3:
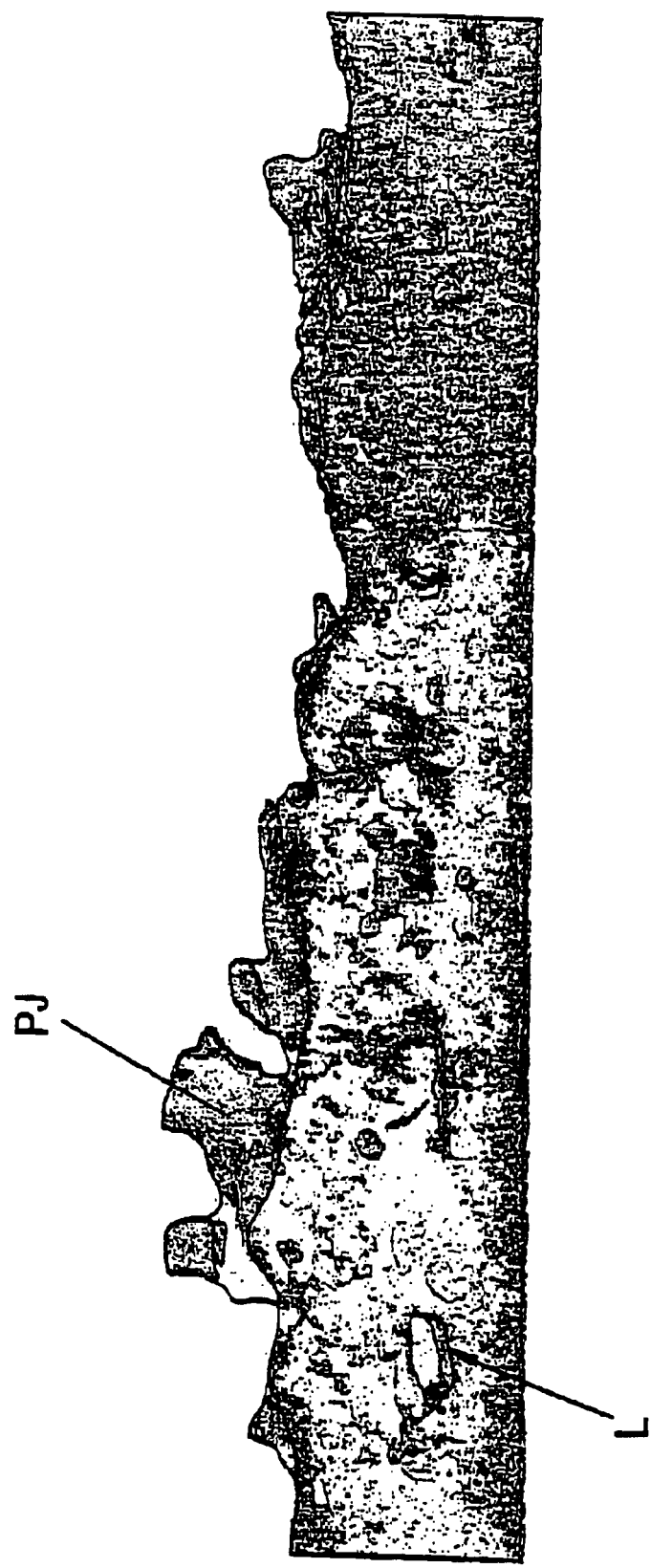
FIG. 3 is a drawing representing a sectioned shell mold made without granular stucco particles on the discontinuous stucco fiber bundles.
Figure 4:
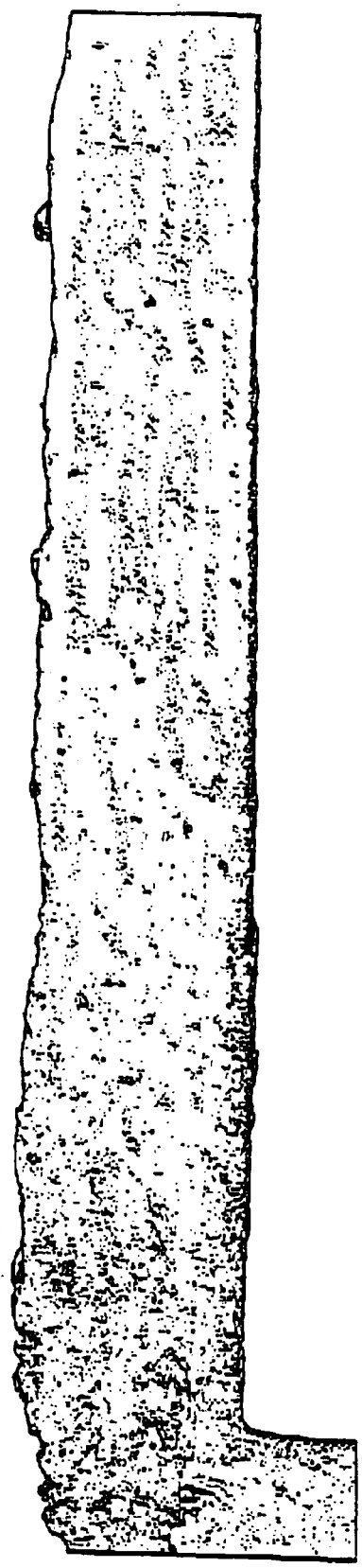
FIG. 4 is a drawing representing a sectioned shell mold wall made pursuant to a preferred method of the invention.

It is apparent from Table I that the ceramic slurries and stuccoes of the 1st (facecoat), 2nd, 3rd, 7th, and 8th layers were the same. Slurry A comprised an alumina-based slurry using a 12 nm size colloidal silica binder liquid (LUDOX HS30 binder from Grace Chemicals Corp.). Slurries B, C and D each comprised a zircon-based slurry using the 12 nm size colloidal silica binder liquid. Dips using two slurries are designated B/C (and B/D in later examples) and represent the well known practice of initially dipping in a low viscosity slurry followed by dipping in a standard, higher viscosity slurry. The stucco for the 1st stucco layer was −120 mesh fused alumina granular stucco (−120 mesh meaning less than 120 mesh particles). The stucco for the 2nd stucco layer was −90 mesh fused alumina granular stucco. The stucco for the 3rd stucco layer was 28×48 mesh tabular FIGS. 3 and 4 illustrate the built-up wall of shell mold sample B and C, respectively. The difference between shell mold B and C is dramatic in that the mold sample C exhibits less porosity for a given shell mold wall thickness and less fiber-bridging (where fibers bridge across one another creating a void). Random orientation of the stucco fiber bundles and fiber-bridging are apparent in sample B in FIG. 3, both of which increase wall porosity and the number of void defects in the mold wall, reducing mold strength. For example, the projections PJ on the outer mold sample surface (left hand side of FIG. 3) are discontinuous stucco "Q" fiber bundles oriented outwardly and transversely of the plane of the sample wall. Several large voids V are apparent and associated with the random discontinuous stucco fiber bundles. In FIG. 4, application of the granular stucco particles has rearranged the discontinuous stucco fiber bundles to provide a higher fiber packing density with granular stucco particles filling spaces between the stucco fibers to produce a more dense and stronger shell mold wall.

Mechanical properties were determined for mold samples A, B and C and are set forth in Table II below:

TABLE II

|  | Sample A | Sample B | Sample C |
|---|---|---|---|
| MOR (Psi) | 830 | 657 | 900 |
| EBP | 0.059 | 0.253 | 0.307 |
| Shell Porosity (%) | 20.4 | 28.5 | 23.6 |

As the results show, mold sample C retained similar strength and porosity as sample A with improved EBP (EBP is energy to break point expressed in units of lbf-in). Sample B, however, became weaker and more porous due to fiber bridging. The overall mechanical properties of sample C pursuant to the invention are improved significantly, so that cracking probability of the shell mold during pattern removal, mold handling, and casting should be reduced.

Example 2

Figure 5:
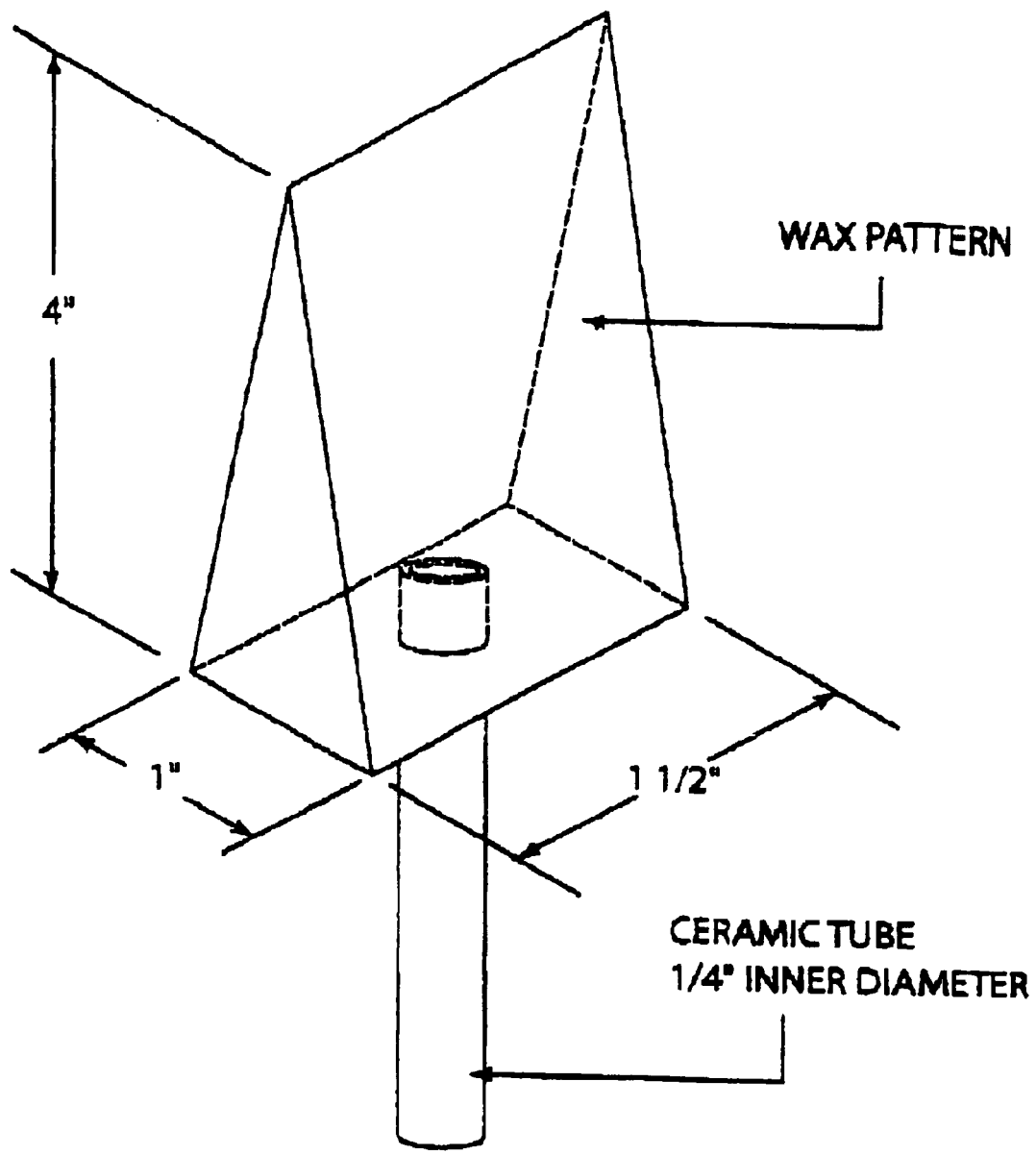
FIG. 5 is a perspective view of a wedge shaped pattern used to make a shell mold for pattern removal trials.

This example describes how shell mold performance during pattern removal can be improved by practice of the invention. A wedge shaped wax pattern, FIG. 5, was used to test the probability of shell mold cracking. This wedge shaped pattern can often cause shell mold cracking along the edges of the wedge.

Test wedge shaped shell molds were made as shown in Tables III below. Slurry A and B were equivalent to slurry A and B in Example 1. Slurry D was similar to slurry C in Example 1 with a higher organic binder content. Some wedge shaped molds A1, B1, C1 were made with no fiber reinforcement, and the other set A2, B2, C2 was made with "Q" fiber reinforcement bundles followed by application on the fiber bundles of 14×28 tabular alumina stucco (designated 14–28 in Table III) as described in Example 1. After steam dewaxing operation to remove the pattern, each wedge shaped mold was inspected, and the probability of cracking was calculated based on percentage of cracked wedge shaped molds out of the total shell molds.

TABLES III

| Dip | Slurry | Stucco size |
|---|---|---|
| Wedge Specimen A1 (9-layer shell) | | |
| 1st | A | 120 |
| 2nd | B/D | 90 |
| 3rd | B/D | 28–48 |
| 4th | D | 14–28 |
| 5th | D | 14–28 |
| 6th | D | 14–28 |
| 7th | D | 14–28 |
| 8th | D | 14–28 |
| 9th | D | |
| Wedge Specimen A2 (9-layer shell) | | |
| 1st | A | 120 |
| 2nd | B/D | 90 |
| 3rd | B/D | 28–48 |
| 4th | D | ¼" Q. fiber, 14–28 |
| 5th | D | 14–28 |
| 6th | D | 14–28 |
| 7th | D | ¼" Q. fiber, 14–28 |
| 8th | D | 14–28 |
| | | D |

TABLES III-continued

| Dip | Slurry | Stucco size |
|---|---|---|
| Wedge Specimen B1 (8-layer shell) | | |
| 1st | A | 120 |
| 2nd | B/D | 90 |
| 3rd | B/D | 28–48 |
| 4th | D | 14–28 |
| 5th | D | 14–28 |
| 6th | D | 14–28 |
| 7th | D | 14–28 |
| 8th | D | |
| Wedge Specimen B2 (8-layer shell) | | |
| 1st | A | 120 |
| 2nd | B/D | 90 |
| 3rd | B/D | 28–48 |
| 4th | D | ¼" Q. fiber, 14–28 |
| 5th | D | 14–28 |
| 6th | D | ¼" Q. fiber, 14–28 |
| 7th | D | 14–28 |
| 8th | D | |
| Wedge Specimen C1 (7-layer shell) | | |
| 1st | A | 120 |
| 2nd | B/D | 90 |
| 3rd | B/D | 28–48 |
| 4th | D | 14–28 |
| 5th | D | 14–28 |
| 6th | D | 14–28 |
| 7th | D | |
| Wedge Specimen C2 (7-layer shell) | | |
| 1st | A | 120 |
| 2nd | B/D | 90 |
| 3rd | B/D | 28–48 |
| 4th | D | ¼" Q. fiber, 14–28 |
| 5th | D | ¼" Q. fiber, 14–28 |
| 6th | D | 14–28 |
| 7th | D | | wherein "28–48" and "14–28" in Tables III correspond to 28×48 and 14×28 mesh size granular stucco in Table I.

Wedge shaped shell mold specimens A1–C2 were placed in a steam autoclave to remove the wax pattern. After steam dewaxing operation, each wedge shaped mold was inspected, and the probability of cracking (prob. cracking) was calculated based on percentage of cracked wedge shaped molds out of the total shell molds and listed in Table IV below.

TABLE IV

| Wedge Specimen | prob. Cracking (%) |
|---|---|
| A1 | 100 |
| A2 | 0 |
| B1 | 100 |
| B2 | 0 |
| C1 | 100 |
| C2 | 0 |

Under steam autoclave dewaxing conditions, the Q fiber bundle-reinforced shell molds A2, B2, C2 showed no cracking for any of the molds tested, whereas all of the standard (non-Q fiber bundle reinforced) shell molds A1, B1, C1 were cracked. Mold sample C2 with only 7 layers including 2 Q fiber bundle layers had no cracks as compared with the thicker 9-layer mold sample A1 with 100% cracking probability. Dewaxing performance of the shell molds produced pursuant to the invention is substantially improved.

The above sample shell molds also were subjected to furnace dewaxing where a furnace was first heated to 1600 degrees F. Then, the wedge shaped sample shell molds were pushed into the furnace to remove the wax pattern and then inspected after removal from the furnace. The probability of cracking (prob. cracking) for each sample shell mold was calculated and listed in Table V below:

TABLE V

| Wedge Specimen | prob. Cracking (%) |
|---|---|
| A1 | 0 |
| A2 | 0 |
| B1 | 100 |
| B2 | 0 |
| C1 | 100 |
| C2 | 25 |

Under the flash dewax conditions of the heated furnace, the experimental results demonstrated significant reductions of shell mold cracking by practice of the invention. For example, the 8-layer shell mold with Q fiber bundle reinforcement (sample B2) had no cracking, while the standard shell molds without Q fiber bundle reinforcement (sample B1) were all cracked.

Compression mold spool specimens were made by the lost wax process described in U.S. Pat. No. 4,966,225 by applying to identical wax patterns the ceramic slurry layers/stucco layers as shown in Table VI below:

After final drying of the shell mold layers, the opposite ends of each ceramic invested test spools were cut as shown in FIG. 6B to produce compression test spool samples, one shown in FIG. 6C. The cut test spool samples were steam de-waxed to remove the wax pattern. The test samples were fired at 1600 degrees F. for 2 hours in air and cooled to room temperature. Then, the test fired test samples were wrapped with Kaowool insulation prior to compression testing.

For compression testing, the test samples were heated to 2200 degrees F. for 4 hours in a furnace. Four test samples from each group of Table VI were pulled out of the furnace and tested for hot compression strength in a test oven. The actual testing temperature on one test sample out of each group was measured with an attached thermocouple during compression testing. Then, the test oven temperature was lowered to 2000 degrees F., 1500 degrees F., and room temperature respectively. Four test samples were tested at each temperature. Typical actual temperatures are shown in parentheses in FIGS. 7 and 8.

Figure 7:
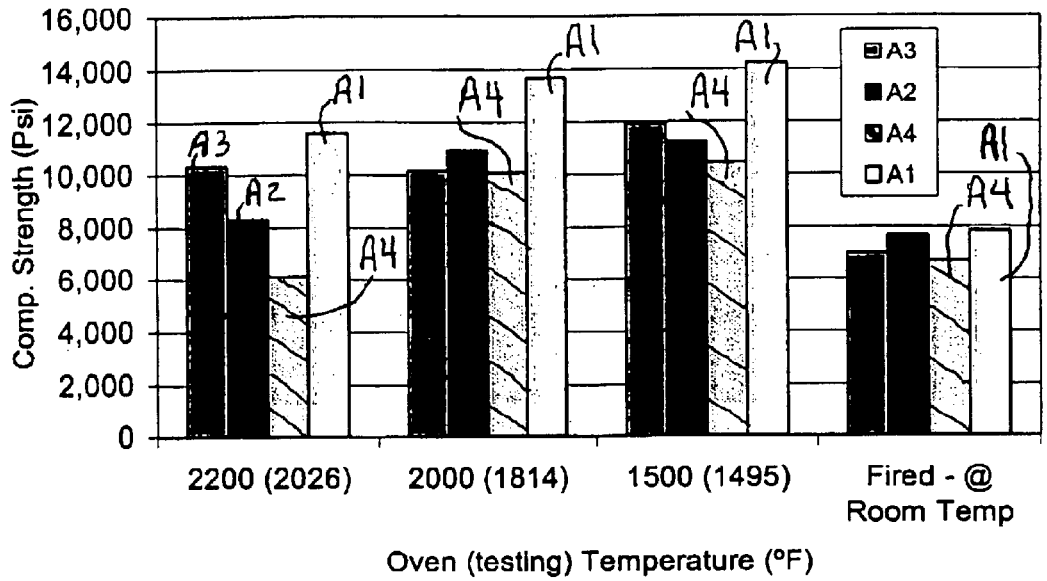
FIG. 7 is a bar graph of compressive strength of test spools at different cooling temperatures after preheat to 2200 degrees C. for 4 hours.
Figure 8:
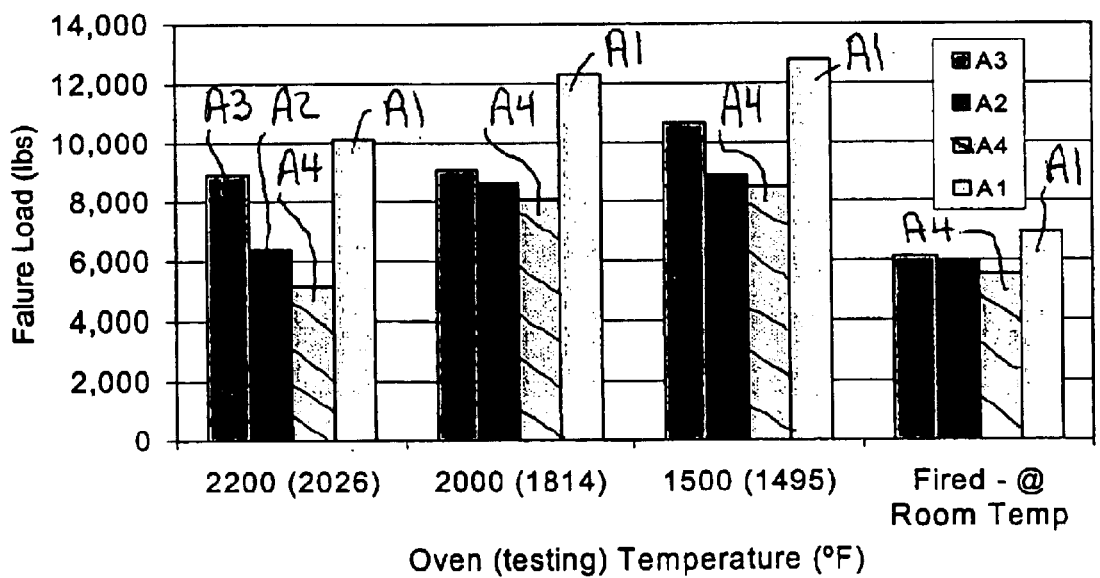
FIG. 8 is a bar graph of failure loads of compression test spools at different cooling temperatures after preheat to 2200 degrees C. for 4 hours.

FIGS. 7 and 8 show the hot compression results of all groups of test spool samples A1, A2, A3, A4 at the different test temperatures. The standard test samples A1 showed increasing compressive strength and load bearing capability as the temperature decreased from 2200 degrees F. to 1500 degrees F. Lower compressive strength at 2200 degrees F. could be due to softening of the silica ceramic slurry binder.

TABLE VI

| | | Stucco System | | | |
|---|---|---|---|---|---|
| Dip | Slurry | Spool Specimen A1 | Spool Specimen A2 | Spool Specimen A3 | Spool Specimen A4 |
| 1st | A | 120 | 120 | 120 | 120 |
| 2nd | B/C | 90 | 90 | 90 | 90 |
| 3rd | B/C | 28–48 | 28–48 | 28–48 | 28–48 |
| 4th | C | 14–28 | ¼" H-fiber bundle, 14–28 | ¼" Q-fiber bundle, 14–28 | ⅜" Q-fiber bundle, 14–28 |
| 5th | C | 14–28 | 14–28 | 14–28 | 14–28 |
| 6th | C | 14–28 | ¼" H-fiber bundle, 14–28 | ¼" Q-fiber bundle, 14–28 | ⅜" Q-fiber bundle, 14–28 |
| 7th | C | 14–28 | 14–28 | 14–28 | 14–28 |
| 8th | C | 14–28 | ¼" H-fiber bundle, 14–28 | ¼" Q-fiber bundle, 14–28 | ⅜" Q-fiber bundle, 14–28 |
| 9th | C | | | | |

Ceramic slurries A, B, and C were the same as set forth in Table I. The tabular alumina likewise was the same as Table I. The discontinuous chopped "H" fiber bundles comprised greater than 95% silica and had a fiber diameter in the range of 5 to 10 microns with a bundle diameter of 0.01 to 0.02 inch and a bundle length of ¼ inch and included fugitive PVA binder as received from the manufacturer. The "H" fiber yarn with PVA binder and chopped to length was obtained from Ametek Chemical Products Division, 900 Greenbank Rd., Wilmington, Del. 19808.

The discontinuous chopped "Q" fiber bundles comprised silica and had a fiber diameter in the range of 9 to 14 microns with a bundle diameter of 0.01 to 0.02 inch and a bundle length of ¼ or ⅜ inch. Unchopped "Q" fiber yarn (QUARTZEL silica fiber) is available from Saint-Gobain Quartz, 1600 W. Lee St., Louisville, Ky. The continuous "Q" fiber yarn was pulled through a bath of the organic binder (e.g PVA) and then chopped by OMNIA LLC, Raleigh, N.C. to form bundles of "Q" fibers held together by the PVA binder.

The test spools were prepared using a spool-shaped wax pattern as shown in FIG. 6A. The patterns were dipped and stuccoed pursuant to different sequences shown in Table VI.

When fired test samples cooled back to room temperature, the compressive strength dropped to about 55% of the strength at 1500 degrees F. Transformation of silica to cristobalite at high temperatures and subsequent cooling through the cristobalite inversion at about 200 degrees F. may contribute to micro-cracking and therefore result in a weaker shell.

The compression test results indicated that the fiber bundle reinforced simulated shell mold test samples A2, A3, A4 pursuant to the invention exhibited reduced hot compressive strength by up to 49% as compared to the comparison shell mold A1 of Table VI. These lower compressive strengths can help reduce hot tear defects and grain recrystallization defects in single crystal castings.

For example, six shell molds were produced using the dipping stucco sequences A or B shown in Table VII below. Each mold was produced around an assembly of 18 cored, wax airfoil patterns. Three of the molds were produced using the standard sequence A, and three molds were produced using the sequence B with fiber bundles followed by 14–28 alumina stucco to form the 4th mold layer pursuant to the invention. After pattern removal by steam autoclaving and burnout in a conventional gas-fired kiln, the six molds were cast using a conventional directional soldification casting process for production of single crystal nickel base superalloy airfoils. Six of the 54 single crystal cast airfoils (i.e. 11% of the cast airfoils) produced in the shell molds of sequence A were scrap due to recrystallization (RX) defects caused by stresses during cooling after casting. In contrast, only one of 54 single crystal cast airfoils (i.e. 2% of the cast airfoils) produced using the shell molds of sequence B with fiber bundles in the 4th mold layer was scrapped due to RX defects. This represents an 83% reduction in RX defect scrap.

TABLE VII

|  | Slurry | Stucco Sequence A | Stucco Sequence B |
| --- | --- | --- | --- |
| 1st | E | 120 | 120 |
| 2nd | B/C | 90 | 90 |
| 3rd | B/F | 28–48 | 28–48 |
| 4th | C | 14–28 | 1/4 in. Q fiber bundles/ 14–28 |
| 5th | F | 14–28 | 14–28 |
| 6th | C | 14–28 | 14–28 |
| 7th | F | 14–28 | 14–28 |
| 8th | C |  |  | where slurry E is a zirconia based slurry using 12 nm colloidal silica binder and slurry F is an alumina based slurry using 12 nm colloidal silica binder. Slurries B and C correspond with those described above. The alumina stuccoes 90, 120, 28–48, and 14–28 are described above.

Although the present invention has been described with respect to certain specific illustrative embodiments thereof, it is not so limited and can be modified and changed within the spirit and scope of the invention as set forth in the appended claims.

We claim:

1. A method of making a ceramic shell mold, comprising repeatedly coating a fugitive pattern of an article to be cast with a ceramic slurry layer and applying on the ceramic slurry layer a refractory stucco to form a plurality of ceramic slurry layers and stucco layers on the pattern wherein at least one of the stucco layers is formed at least in part by applying bundles of discontinuous stucco fibers held together in the bundle by a fugitive binder on a ceramic slurry layer.

2. The method of claim 1 including the further step of applying a granular stucco particles on the bundles of the discontinuous stucco fiber bundles.

3. The method of claim 2 wherein the granular stucco particles are applied on randomly oriented discontinuous stucco fiber bundles to pack the discontinuous stucco fiber bundles down on the slurry layer underlying the discontinuous fibers.

4. The method of claim 3 wherein the granular stucco particles are applied on the randomly oriented discontinuous stucco fiber bundles while the underlying slurry layer is still wet such that a majority of the packed down discontinuous stucco fiber bundles stick to the slurry layer.

5. The method of claim 3 wherein the granular stucco particles are applied on the randomly oriented discontinuous stucco fiber bundles to form a stucco layer comprising packed down discontinuous stucco fiber bundles and the granular stucco.

6. The method of claim 5 wherein some of the granular stucco particles fill spaces between the packed down discontinuous stucco fiber bundles.

7. The method of claim 1 wherein the granular stucco particles are applied by raining the granular stucco particles by gravity down on the discontinuous stucco fiber bundles.

8. The method of claim 6 wherein the discontinuous stucco fiber bundles and the granular stucco particles comprise the same or different ceramic material.

9. The method of claim 1 including the further step of firing the shell mold at an elevated temperature to remove the fugitive binder, leaving spaces between the stucco fibers to reduce compressive strength of the shell mold.

10. In a directional solidfication casting process to make a single crystal casting, the improvement comprising casting a molten metallic material in a ceramic shell mold made pursuant to claim 9 to reduce occurrence of recrystallization in the single crystal casting.

11. The method of claim 10 wherein the metallic material comprises a nickel base superalloy or a cobalt base superalloy.

* * * * *